US012170445B2

(12) United States Patent
Chen

(10) Patent No.: US 12,170,445 B2
(45) Date of Patent: Dec. 17, 2024

(54) WIRELESS CHARGING SYSTEM FOR WEARABLE DEVICES

(71) Applicant: Meta Platforms Technologies, LLC, Menlo Park, CA (US)

(72) Inventor: Baifeng Chen, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/122,480

(22) Filed: Mar. 16, 2023

(65) Prior Publication Data

US 2024/0313580 A1 Sep. 19, 2024

(51) Int. Cl.
| | |
|---|---|
| *H02J 50/10* | (2016.01) |
| *H02J 50/40* | (2016.01) |
| *H02M 3/07* | (2006.01) |
| *H02M 3/24* | (2006.01) |

(52) U.S. Cl.
CPC .............. *H02J 50/10* (2016.02); *H02J 50/40* (2016.02); *H02M 3/07* (2013.01); *H02M 3/24* (2013.01); *H02J 2207/20* (2020.01)

(58) Field of Classification Search
CPC ........ H02J 50/10; H02J 50/40; H02J 2207/20; H02M 3/07; H02M 3/24
See application file for complete search history.

(56) References Cited

U.S. PATENT DOCUMENTS

| | | | |
|---|---|---|---|
| 10,326,315 B2 | 6/2019 | Bae et al. | |
| 10,498,160 B2 | 12/2019 | Desai et al. | |
| 10,658,871 B2 | 5/2020 | Kwon et al. | |
| 11,601,056 B2 * | 3/2023 | Kulkarni | H02M 1/009 |
| 2018/0159353 A1 * | 6/2018 | Pan | H02J 50/12 |
| 2018/0219415 A1 | 8/2018 | Ren | |
| 2020/0366120 A1 * | 11/2020 | Yuan | H02J 50/12 |
| 2022/0014048 A1 | 1/2022 | Zhou et al. | |

OTHER PUBLICATIONS

Miura S., et al., "Bi-directional Wireless Charging between Portable Devices," International Conference on Renewable Energy Research and Applications, Oct. 2013, pp. 775-778.

* cited by examiner

*Primary Examiner* — Carlos Amaya
(74) *Attorney, Agent, or Firm* — Mannava & Kang, P.C.

(57) ABSTRACT

A high frequency, high efficiency, near field wireless charging system and interface for battery-powered wearable devices are provided. A number of various magnetic core, multi-winding transmitter coil, receiver coil configurations may be used with the transmitter coils generating a charge voltage at the receiver coils through magnetic flux. In some configurations, a buck-boost assisted transmitter, or a buck-boost split between transmitter and receiver charging system may be used. In other configurations, a switch-cap boost block on the transmitter side may be used to increase efficiency. In yet other configurations, a dual path charging system (e.g., for smart glass temples) or a dual transmitter—single receiver charging system with buck-boost or switch-cap blocks may be used. The transmitter-receiver pair configurations may also be used to charge a battery module to be inserted into a wearable device.

20 Claims, 16 Drawing Sheets

WIRELESS CHARGING SYSTEM FOR WEARABLE DEVICES

TECHNICAL FIELD

This patent application relates generally to charging of wearable devices, and more specifically, to wireless charging using a buck-boost assisted transmitter-receiver pair for a near-eye display, a smartwatch, a controller, and/or similar devices.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

Wearable devices, such as augmented reality (AR) eyewear or glasses, smartwatches, handheld controllers, and similar ones may include any number of electrical components. One challenge with such devices may involve powering electrical components. For user-friendly utilization, a wearable device may include a battery or set of batteries, which may be charged through a wired and/or a wireless connection. Each approach may present its own challenges such as location of charging interface, efficiency of charging interface, etc.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1A:
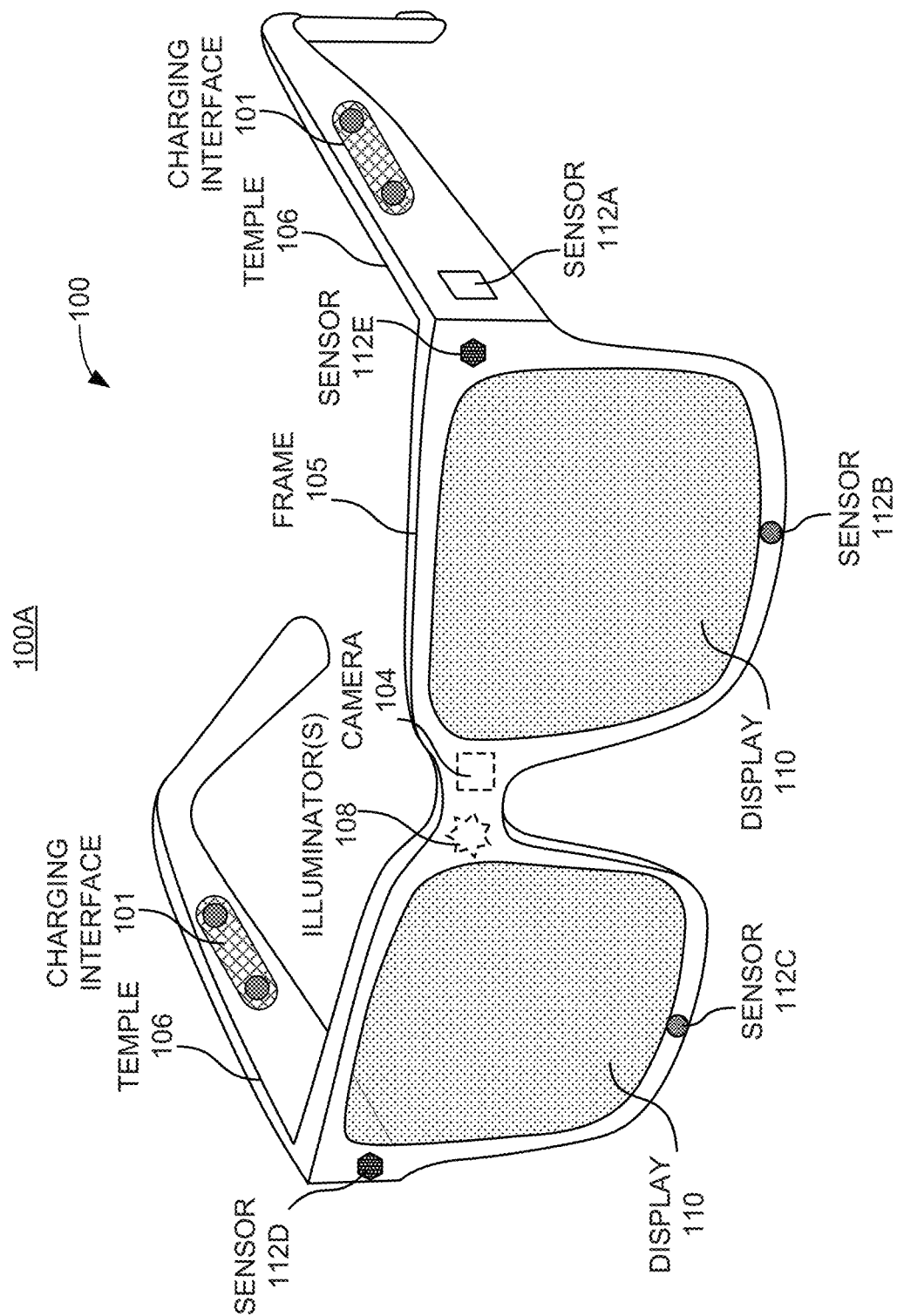
FIG. 1A illustrates a perspective view of a near-eye display in form of a pair of glasses with charging interface(s), according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As used herein, a "near-eye display" may refer to any display device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein, a "user" may refer to a user or wearer of a "near-eye display." As used herein, a "wearable device" may refer to any portable electronic device that may be worn on any body part of a user and used to present audio and/or video content, control other devices, monitor bodily functions, and perform similar actions.

Some wearable devices, such as virtual reality (VR), augmented reality (AR), and/or mixed reality (MR) glasses, smartwatches, handheld controllers, and similar ones may employ any number of mechanical components, optical components, and/or electrical components (e.g., sensors, cameras, illuminators, projectors, etc.) to perform their respective functions. As most electrical components need a power source, such display systems may be fitted with one or more batteries. Wired charging of wearable devices may present logistical challenges, as well as, reliability challenges. For example, charging connectors may not allow water-proof or water resistant wearable devices, metallic connections may degrade with use, etc. Wireless charging methods may mitigate reliability concerns but charging efficiency may be a challenge for such interfaces.

In some examples of the present disclosure, a high frequency, high efficiency, near field wireless charging system and interface for battery-powered wearable devices are provided. A number of various magnetic core, multi-winding transmitter coil, receiver coil configurations may be used with the transmitter coils generating a charge voltage at the receiver coils through magnetic flux. In some configurations, a buck-boost assisted transmitter or a buck-boost split between transmitter and receiver charging system may be used. In other configurations, a switch-cap boost block on the transmitter side may be used to increase efficiency. In yet other configurations, a dual path charging system (e.g., for smart glass temples) or a dual transmitter-single receiver charging system with buck-boost or switch-cap blocks may be used. The transmitter-receiver pair configurations may also be used to charge a battery module to be inserted into a wearable device.

In some examples, high frequency wireless charging may be accomplished for wearable devices supporting up to 5

Watts with a relatively small wireless coil charging size. System regulation may also be avoided. Other benefits and advantages may also be apparent.

FIG. 1A illustrates a perspective view of a near-eye display in form of a pair of glasses with charging interface(s), according to an example. The near-eye display device 100 shown in diagram 100A may be an implementation of a wearable device, specifically, a head-mounted display (HMD) device configured to operate as a virtual reality (VR) display, an augmented reality (AR) display, and/or a mixed reality (MR) display.

In some examples, the near-eye display device 100 may include a frame 105, temples 106, and a display 110. The display 110 may be configured to present media or other content to a user and may include display electronics and/or display optics. For example, the display 110 may include a transparent liquid crystal display (LCD) display panel, a transparent light-emitting diode (LED) display panel, or a transparent optical display panel (e.g., a waveguide display assembly). Other optical components may include waveguides, gratings, lenses, mirrors, etc. Electrical components may include sensors 112A-112E, camera 104, illuminator(s) 108, etc. In some examples, the temples 106 may include at least one or more embedded batteries (not shown) to power the electrical components along with charging interface(s) 101.

In some examples, the various sensors 112A-112E may include any number of depth sensors, motion sensors, position sensors, inertial sensors, and/or ambient light sensors, as shown. In some examples, the various sensors 112A-112E may include any number of image sensors configured to generate image data representing different fields of views in one or more different directions. In some examples, the various sensors 112A-112E may be used as input devices to control or influence the displayed content of the near-eye display device 100, and/or to provide an interactive virtual reality (VR), augmented reality (AR), and/or mixed reality (MR) experience to a user of the near-eye display device 100. In some examples, the various sensors 112A-112E may also be used for stereoscopic imaging or other similar application. A virtual reality engine (implemented on the near-eye display device 100 or on another computing device and wirelessly coupled to the near-eye display device 100) may execute applications within the near-eye display device 100 and receive depth information, position information, acceleration information, velocity information, predicted future positions, or any combination thereof of the near-eye display device 100 from the various sensors 112A-112E.

In some examples, the near-eye display device 100 may further include one or more illuminators 108 to project light into a physical environment. The projected light may be associated with different frequency bands (e.g., visible light, infra-red light, ultra-violet light, etc.), and may serve various purposes. In some examples, the one or more illuminator(s) 108 may be used as locators. Each of the locators may emit light that is detectable by an external imaging device. This may be useful for the purposes of head tracking or other movement/orientation. It should be appreciated that other elements or components may also be used in addition or in lieu of such locators.

In some examples, the near-eye display device 100 may also include a camera 104 or other image capture unit. The camera 104, for instance, may capture images of the physical environment in the field of view. In some instances, the captured images may be processed, for example, by a virtual reality engine (implemented on the near-eye display device 100 or on another computing device and wirelessly coupled to the near-eye display device 100) to add virtual objects to the captured images or modify physical objects in the captured images, and the processed images may be displayed to the user by the display 110 for augmented reality (AR) and/or mixed reality (MR) applications.

In some examples, the near-eye display device 100 may be implemented in any suitable form-factor, in addition to the pair of glasses shown in the figure, such as a head-mounted display (HMD) or other similar wearable eyewear or device. The near-eye display device 100 may also include (not shown) one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking system(s) may capture reflected radio waves emitted by a miniature radar unit. These data associated with the eye may be used to determine or predict eye position, orientation, movement, location, and/or gaze.

As described herein, the near-eye display device 100 may include one or more batteries to supply power to any electrical components. The charging interface(s) 101 may be provided to charge the one or more batteries. In some examples, the at least one or more batteries may be incorporated into a body of one or both temples 106 and the charging interface(s) 101 may be a connector or wireless charging at a location on one or both of the temples 106. Wired charging may be more efficient than wireless charging, however, a connector with metal parts may render the near-eye display device 100 susceptible to environmental conditions such as water. Furthermore, degradation of the connector parts through wear-and-tear may reduce a life expectancy of the near-eye display device 100. Wireless charging, on the other hand, may allow complete insulation of the near-eye display device 100, and thereby, reduce environmental susceptibility and wear-and-tear related reliability concerns. In some examples, the charging interface(s) 101 may include an embedded receiver portion of a transmitter-receiver pair of a high frequency wireless charging system with a receiver coil, a rectifier circuit, and other circuitry such as a boost circuit.

Functions described herein may be distributed among components of the near-eye display device 100 in a different manner than is described here. Furthermore, a near-eye display as discussed herein may be implemented with additional or fewer components than shown in FIG. 1A.

Figure 1B:
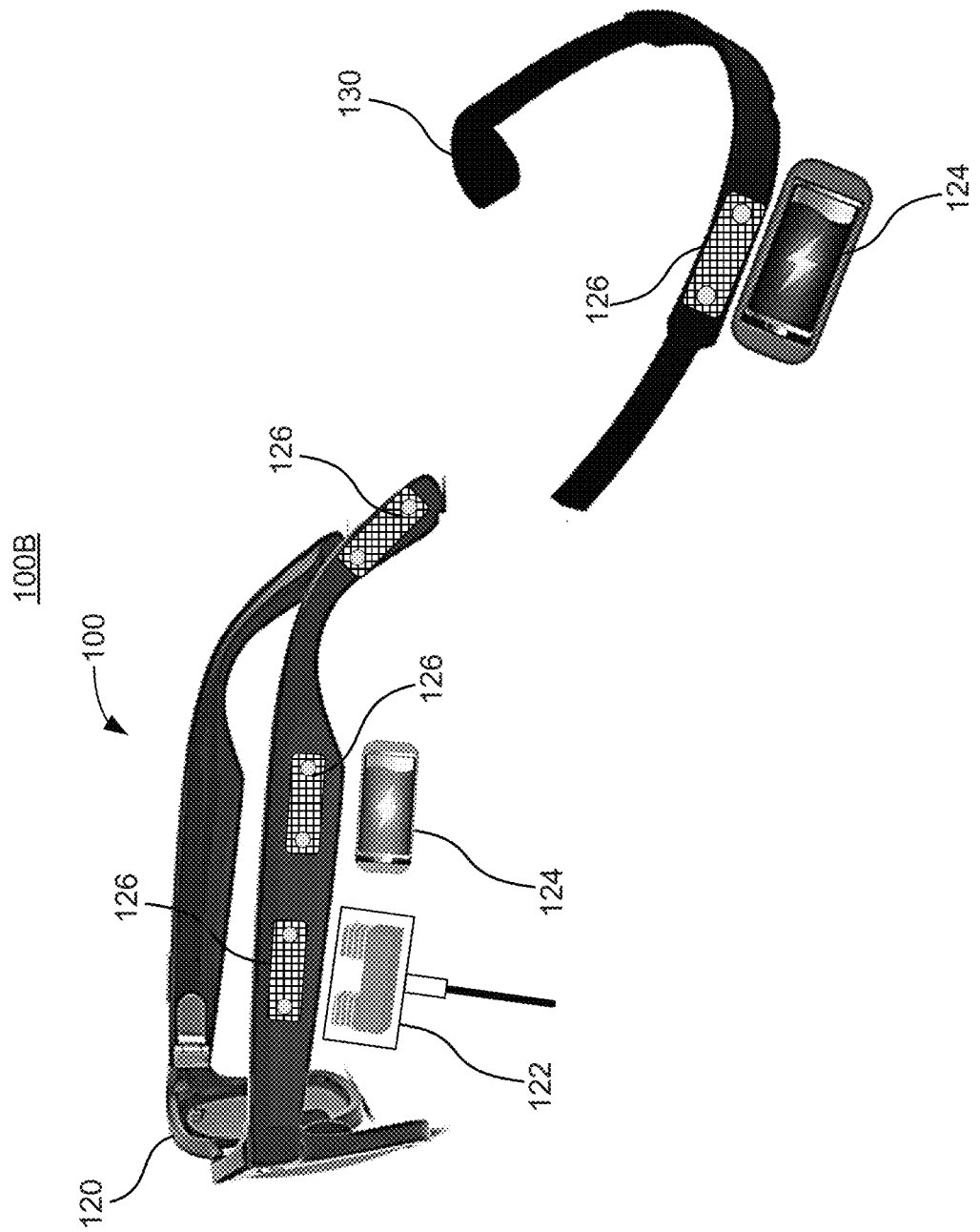
FIG. 1B illustrates a near-eye display in form of a pair of glasses and a lanyard in various charging configurations, according to examples.

FIG. 1B illustrates a near-eye display in form of a pair of glasses and a lanyard in various charging configurations, according to examples. Diagram 100B in FIG. 1B shows augmented reality (AR) glasses 120 as an example of a wearable device with integrated at least one or more batteries, which may be charged through wireless charging by a lanyard 130. The augmented reality (AR) glasses 120 may include charging interfaces 126, which may be positioned at various locations on the temples (or frame in some cases). The receiver of the wireless charging system behind the charging interface(s) may receive charging power from a transmitter of a wireless charger 122 or a battery 124 with wireless charging capability.

In some examples, the lanyard 130 may be a cord, a length of webbing, or a strap that may be attached to a pair of glasses, a camera, a handheld controller, or similar items and utilized to restrain, retrieve, activate, or deactivate. The lanyard 130 may, for example, include a charging interface 126 to receive charge from a battery 124 or a wireless charger. Power exchange between the lanyard 130 and the augmented reality (AR) glasses 120 may be accomplished through wired connection or a transmitter coil/receiver coil pair embedded into a tip portion of one or both of the temples and the lanyard 130.

Figure 2A:
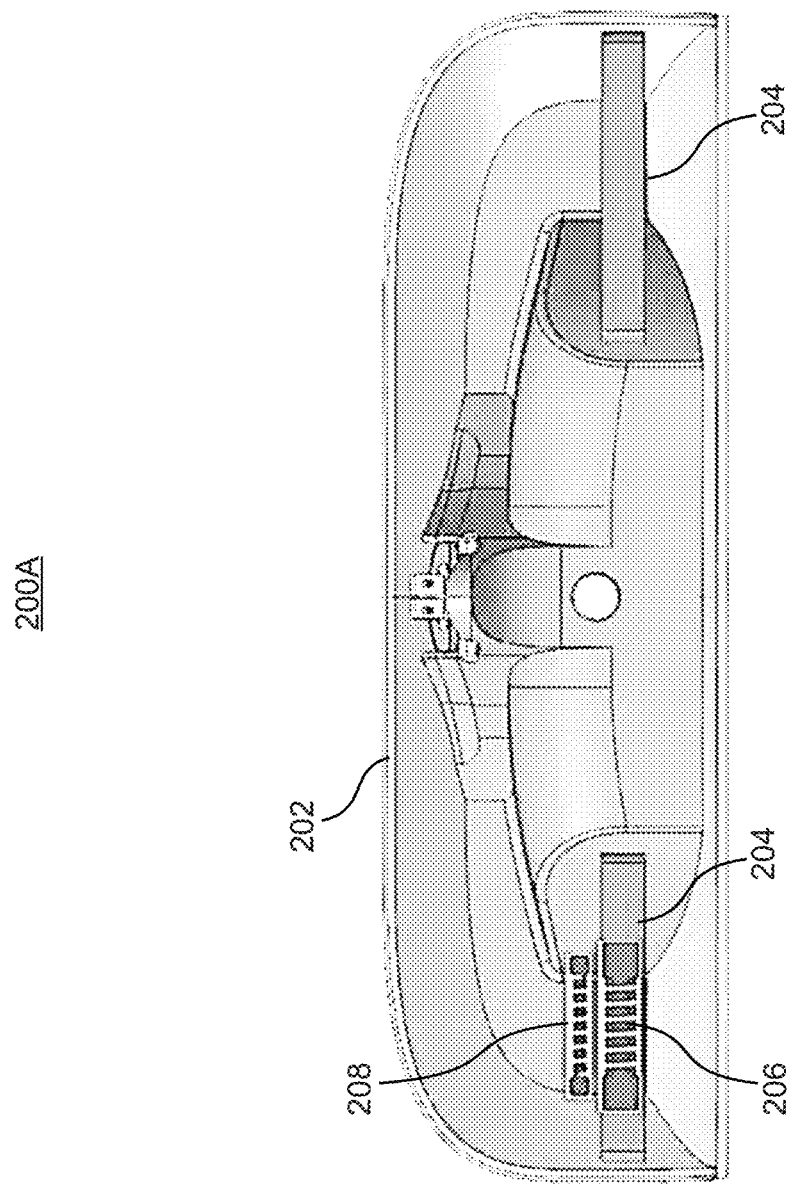
FIGS. 2A-2C illustrate various charging configurations in a charging case for a near-eye display device in form of glasses, according to examples.
Figure 2B:
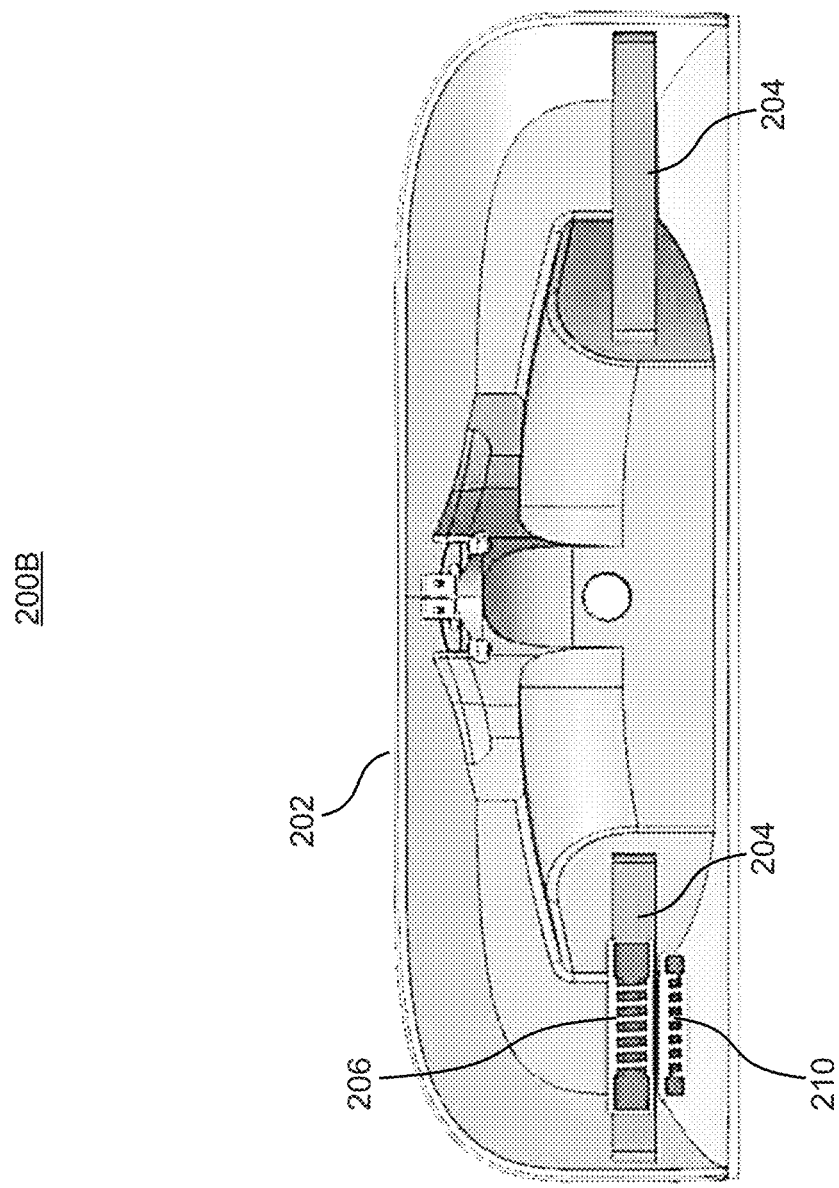
Figure 2C:
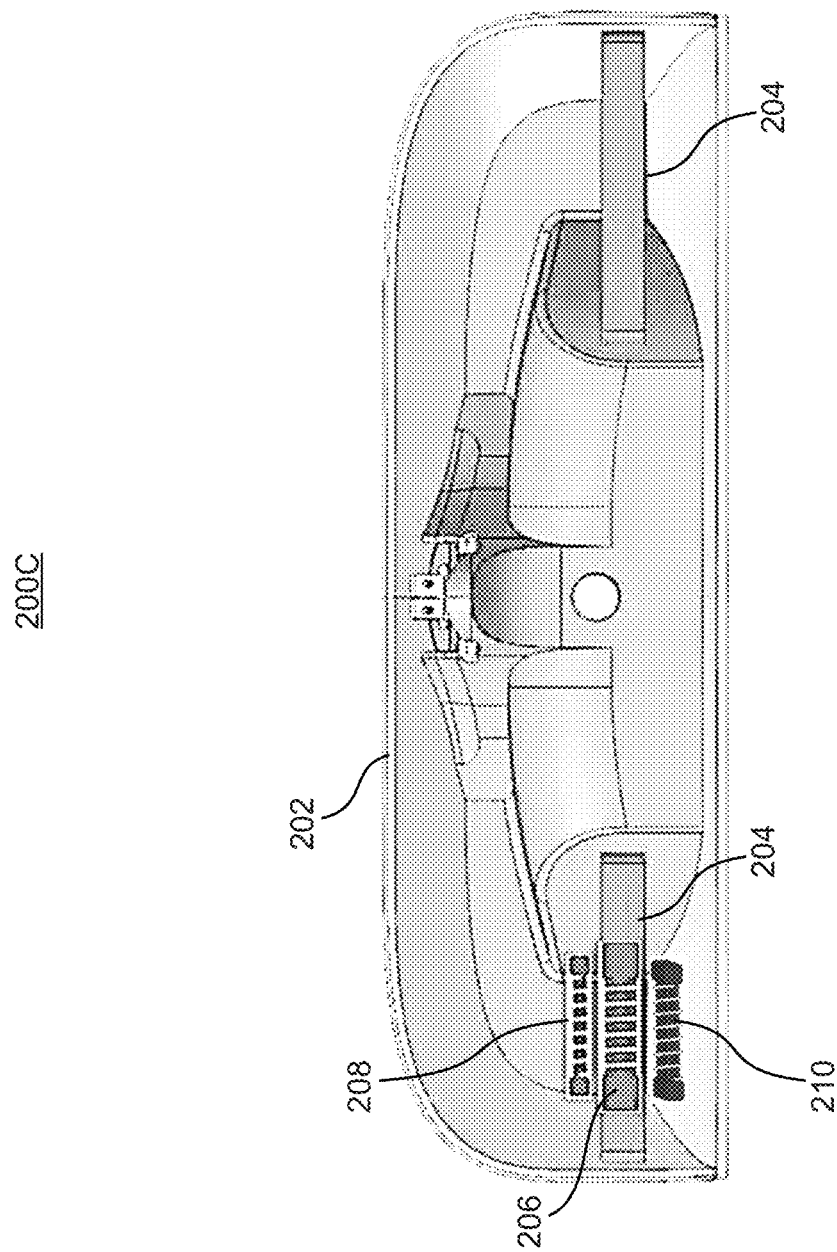

FIGS. 2A-2C illustrate various charging configurations in a charging case for a near-eye display device in form of glasses, according to examples. Diagrams 200A, 200B, and 200C in FIGS. 2A, 2B, and 2C show views of a near-eye display glasses case, in which near-eye display glasses may be charged, with transmitter and receiver charging coils for various temple folding configurations. Diagram 200A in FIG. 2A shows an inside view of a charging-capable case for near-eye display glasses to rest when not in use and be charged at the same time. A bottom half of case enclosure 202 is shown in the diagram along with two separation protrusions 204. The separation protrusions 204 may separate folded temples of the near-eye display glasses. A receiver coil 208 may be embedded into one of the temples (e.g., temple tip) and be placed adjacent to a transmitter coil 206 in resting position. Wireless charging circuitry embedded into the case enclosure 202 may provide charging power through the transmitter coil 206 and receiver coil 208 to circuitry embedded in the near-eye display device.

Diagram 200B of FIG. 2B shows the bottom half of case enclosure 202 with the same components, but the receiver coil 210 placed on an opposite side of the transmitter coil 206. The configurations of diagram 200A and diagram 200B show example scenarios, where the receiver coil of the wireless charging system may be embedded in different temples and/or the temples may be placed on either side of the separation protrusions 204 in resting state and still charge the near-eye display device. The adjacent positioning of the transmitter and receiver coils with a small separation distance between the two may allow high efficiency charging.

Diagram 200C of FIG. 2C shows, in some examples, two receiver coils 208 and 210 may be placed at the tips of both temples of the near-eye display device. In resting state, both receiver coils may interact with the transmitter coil 206 and increase a charging efficiency of the wireless charging system. In the illustrated dual charging coil configuration, regardless of a folding configuration, the still adjacent positioning of the transmitter and receiver coils with a small separation distance between the two may allow high efficiency charging independent of the folding configuration.

As discussed herein, a size of the transmitter coil may be selected based on available space in the charging-capable case. Thus, for larger size glasses, the separation protrusions may be larger and, therefore, larger transmitter coils with higher charging capacity may be used.

Figure 3:
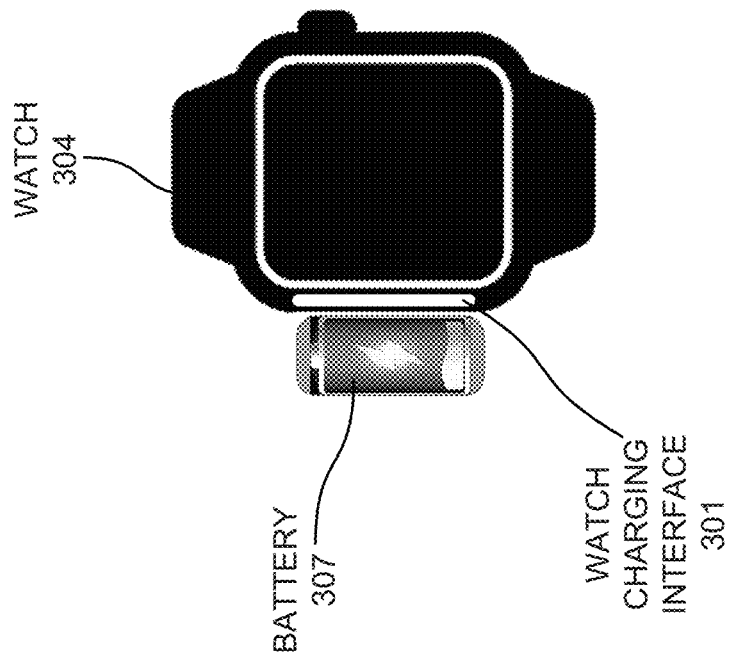
FIG. 3 illustrates charging configurations for a smartwatch, according to examples.
Figure 3:
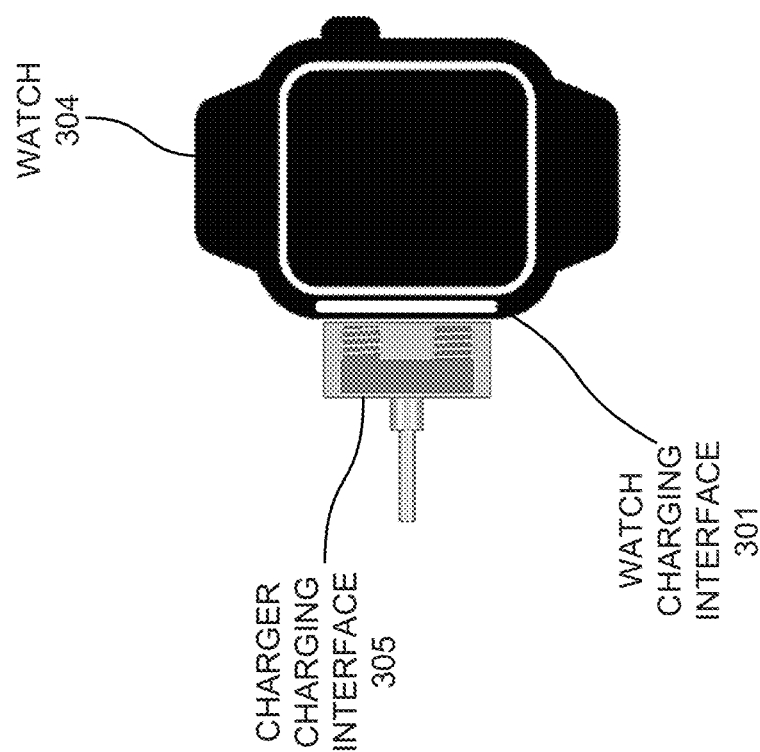

FIG. 3 illustrates charging configurations for a smartwatch, according to examples. Diagram 300 shows a smartwatch 304, where one or more batteries may be embedded in a body of the smartwatch 304. The smartwatch 304 may present audio, visual, or other content to a user, enable communication, monitor bodily functions, and perform other functions. A wireless charging interface 301 at a side (or on a bottom surface) of the smartwatch 304 may include a receiver coil electrically coupled to charge receiver circuitry and be used to charge the at least one or more smartwatch batteries.

In some examples, a charging interface 305 of a wireless charger containing a transmitter coil may be connected (e.g., through magnetic attachment) to the charging interface 301 and provide power to charge the at least one or more batteries of the smartwatch 304. In other examples, a wireless charging capable battery 307 may be used to couple to the charging interface 301 of the smartwatch 304 and charge the at least one or more smartwatch batteries.

Figure 4:
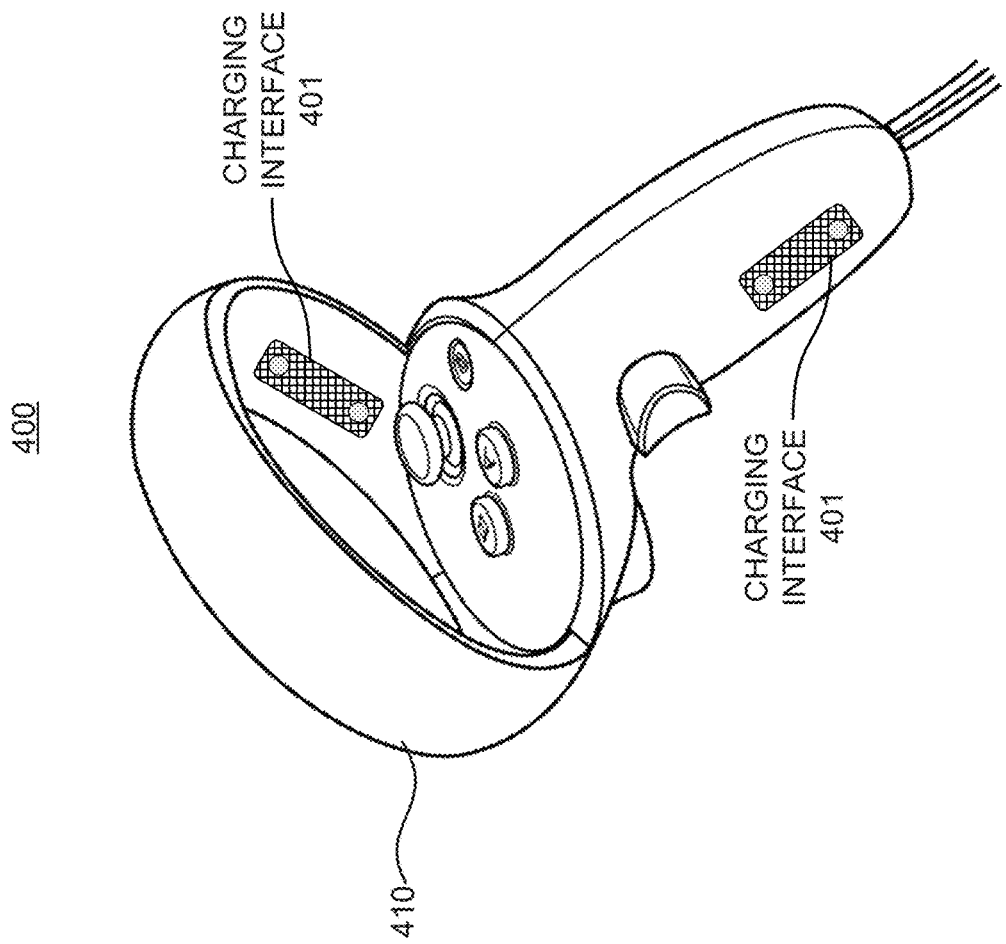
FIG. 4 illustrates a handheld controller with charging interfaces, according to an example.

FIG. 4 illustrates a handheld controller with charging interfaces, according to an example. Diagram 400 shows a handheld controller 410, where one or more batteries may be embedded in a body of the handheld controller 410. The handheld controller 410 may be used to provide input and control functions of a game console, a virtual reality (VR), augmented reality (AR), and/or mixed reality (MR) display system, and other controllable electronic equipment. A charging interface 401 may be positioned on an inside surface, an outside surface, and/or a handle surface of the handheld controller 410.

In some examples, a charging interface of a wireless charger containing a transmitter coil may be connected (e.g., through magnetic attachment) to the charging interface 401 and provide power to charge the at least one or more batteries of the handheld controller 410. In other examples, a wireless charging capable battery may be used to couple to the charging interface 401 of the handheld controller 410 and charge the at least one or more controller batteries.

Because the magnetic field induced charging voltage does not depend on respective orientations of the transmitter and receiver coils, the attachment may not need a polarity. Therefore, the magnets may allow attachment without polarity of the connectors, and the connectors may attract each other regardless of their respective orientations. In some examples, charging efficiency may be further increased by providing shielding material on an outside surface (or on the inside surface, but underneath the transmitter coil) in respective enclosures. This may allow the generated magnetic field to be focused on the receiver coil.

In small form factor wearable devices such as augmented reality (AR)/virtual reality (VR) glasses, smartwatches, handheld controllers, and similar devices, wireless charging may overcome challenges of reliability (e.g., mechanical connection, corrosion, electrostatic discharge, etc.) and allow waterproof enclosures. Expectations from wireless chargers include high charging efficiency and small form factor, among other things. Small wireless charging coil sizes require high frequency wireless charging. However, near field wireless charging is commonly based on poller side driver output resistance for regulation, which causes lower efficiency for most power conditions. Other high frequency wireless charging systems are based on transmitter side duty cycle or frequency regulation, which may cause electromagnetic interference/electromagnetic compatibility issues.

Example wireless charging systems described herein may operate at high frequencies, such as 6.78 MHz, 13.56 MHz, etc. Power transfers up to 5 W may be accommodated. With high frequency operation, small wireless charging coil sizes may be used to fit into the wearable devices. System regulation based on poller side driver output resistance or transmitter side duty cycle or frequency may be avoided. Furthermore, a wide range of battery types such as high voltage lithium-ion batteries (3.7 V) or lower voltage NiMH/NiCd batteries (1.2 V) may be used on the transmitter side.

Figure 5:
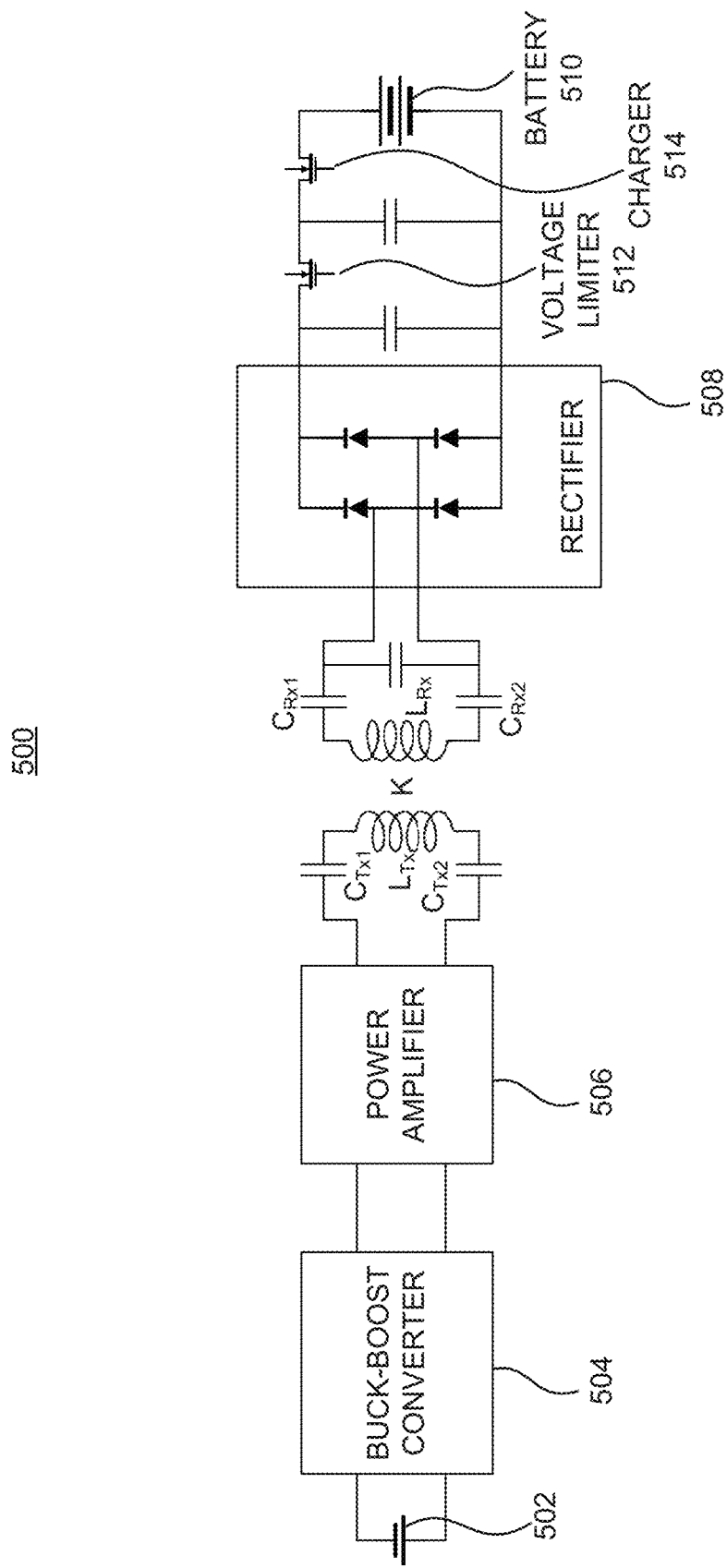
FIG. 5 illustrates a schematic diagram of a buck-boost assisted wireless charging transmitter-receiver pair for a wearable device, according to an example.

FIG. 5 illustrates a schematic diagram of a buck-boost assisted wireless charging transmitter-receiver pair for a wearable device, according to an example. As mentioned herein, a buck-boost assisted transmitter or a buck-boost split between transmitter and receiver charging system may be used as a high frequency, high efficiency, near field wireless charging system for battery-powered wearable devices. Diagram 500 shows transmitter portion of the wireless charging system including a DC source 502 (e.g., a battery), a buck-boost converter 504, a power amplifier 506, and an induction portion including transmit capacitors $C_{Tx1}$, $C_{Tx2}$, and transmit inductor $L_{Tx}$. Diagram 500 also shows the receiver portion including receive inductor $L_{Rx}$, receive capacitors $C_{Rx1}$, $C_{Rx2}$, rectifier 508, voltage limiter 512, and charger 514 coupled to battery 510 of the wearable device.

A buck-boost converter is a DC-to-DC converter with an output voltage either greater than or less than an input voltage in magnitude. A simplest form of a buck-boost converter may include a diode, an inductor, and a capacitor, serially coupled, where the input voltage is provided across the diode and the output voltage is received across the capacitor. Transmit capacitors $C_{Tx1}$, $C_{Tx2}$ may provide DC isolation for the transmit inductor $L_{Tx}$, which generates voltage across the receive inductor $L_{Rx}$ through induction. Based on their windings and a core material between them, the transmit inductor $L_{Tx}$ and the receive inductor $L_{Rx}$ may have a voltage transformation ratio K.

On the receive side, the rectifier 508 may include in an example implementation, a diode bridge, but may be implemented in any suitable way. Two transistors (e.g., field effect transistors "FETs") and parallel coupled capacitors may provide the functionality of a voltage limiter 512 and the charger 514 to charge the battery 510 of the wearable device.

In some examples, the wireless charging system of diagram 500 may provide a system voltage or power regulation based on the buck-boost converter 504. The power amplifier 506 may not need to perform impedance control. Thus, the wireless charging system may be in highest efficiency across a majority of a load range. On the other hand, in case of low output voltage, for example, the power amplifier 506 may operate under low voltage condition, and an output power may be limited due to current capability of the amplifier and an efficiency may be decreased under such circumstances.

Figure 6:
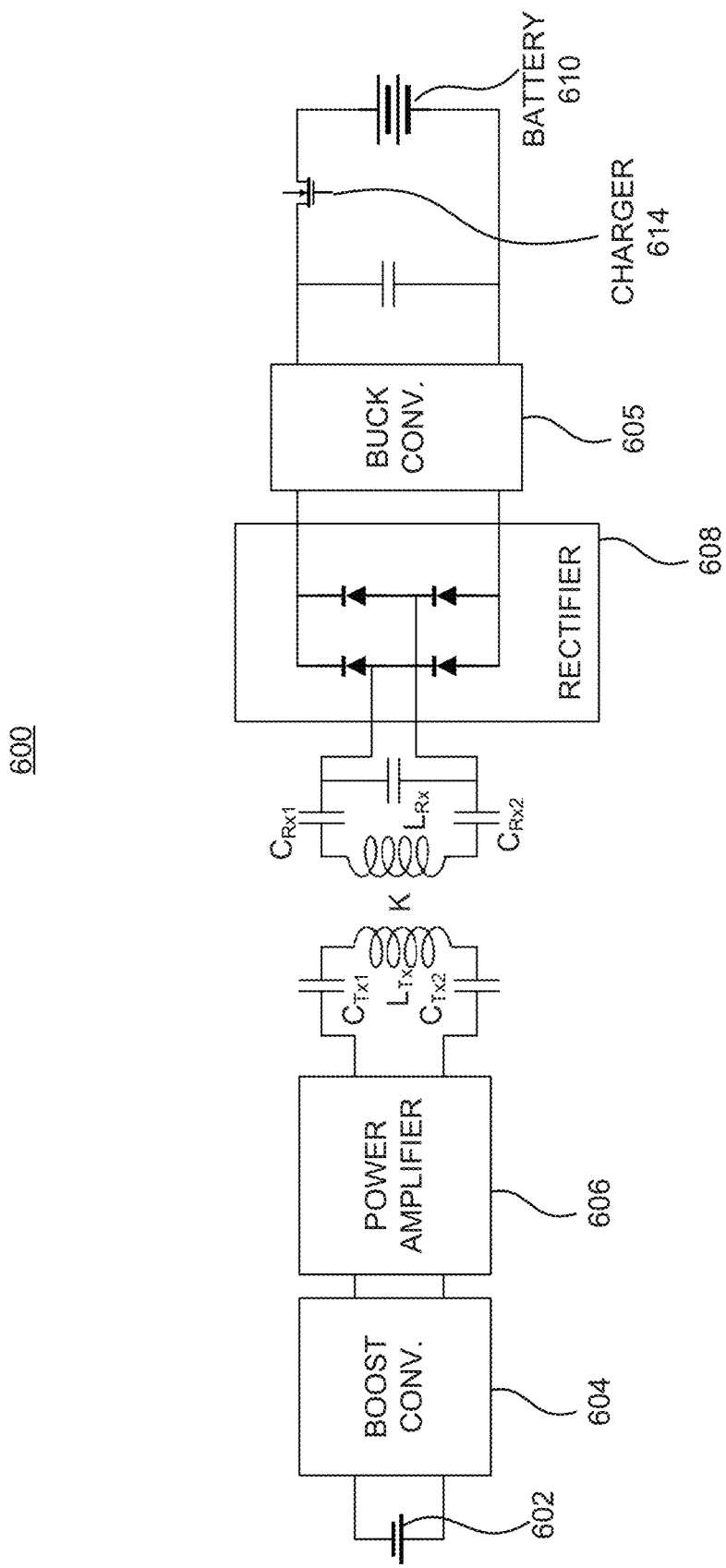
FIG. 6 illustrates a schematic diagram of a split buck-boost assisted wireless charging transmitter-receiver pair for a wearable device, according to an example.

FIG. 6 illustrates a schematic diagram of a split buck-boost assisted wireless charging transmitter-receiver pair for a wearable device, according to an example. Diagram 600 shows transmitter portion of the wireless charging system including a DC source 602 (e.g., a battery), a boost converter 604, a power amplifier 606, and an induction portion including transmit capacitors $C_{Tx1}$, $C_{Tx2}$, and transmit inductor $L_{Tx}$. Diagram 600 also shows the receiver portion including receive inductor $L_{Rx}$, receive capacitors $C_{Rx1}$, $C_{Rx2}$, rectifier 608, a buck converter 605, and charger 614 coupled to battery 610 of the wearable device.

The wireless charging system in diagram 600 may operate similarly to the wireless charging system of FIG. 5 with similar components with the buck-boost converter being split between the transmit and receive portions, where the buck converter 604 is on the transmit side, and the boost converter 605 is on the receive side. In the example implementation of diagram 600, system voltage or power regulation are based on buck or boost converters. The buck converter or the boost converter may be in bypass mode. The power amplifier 606 may not need to perform impedance control. This configuration may allow the power amplifier to be always under high voltage operation condition. Thus, the wireless charging system may be in highest efficiency and high power capability across a majority of a load range. As the boost and buck converters are separated, in order to optimize control, a relatively complex control system may be needed to control the buck and boost operation modes.

Figure 7A:
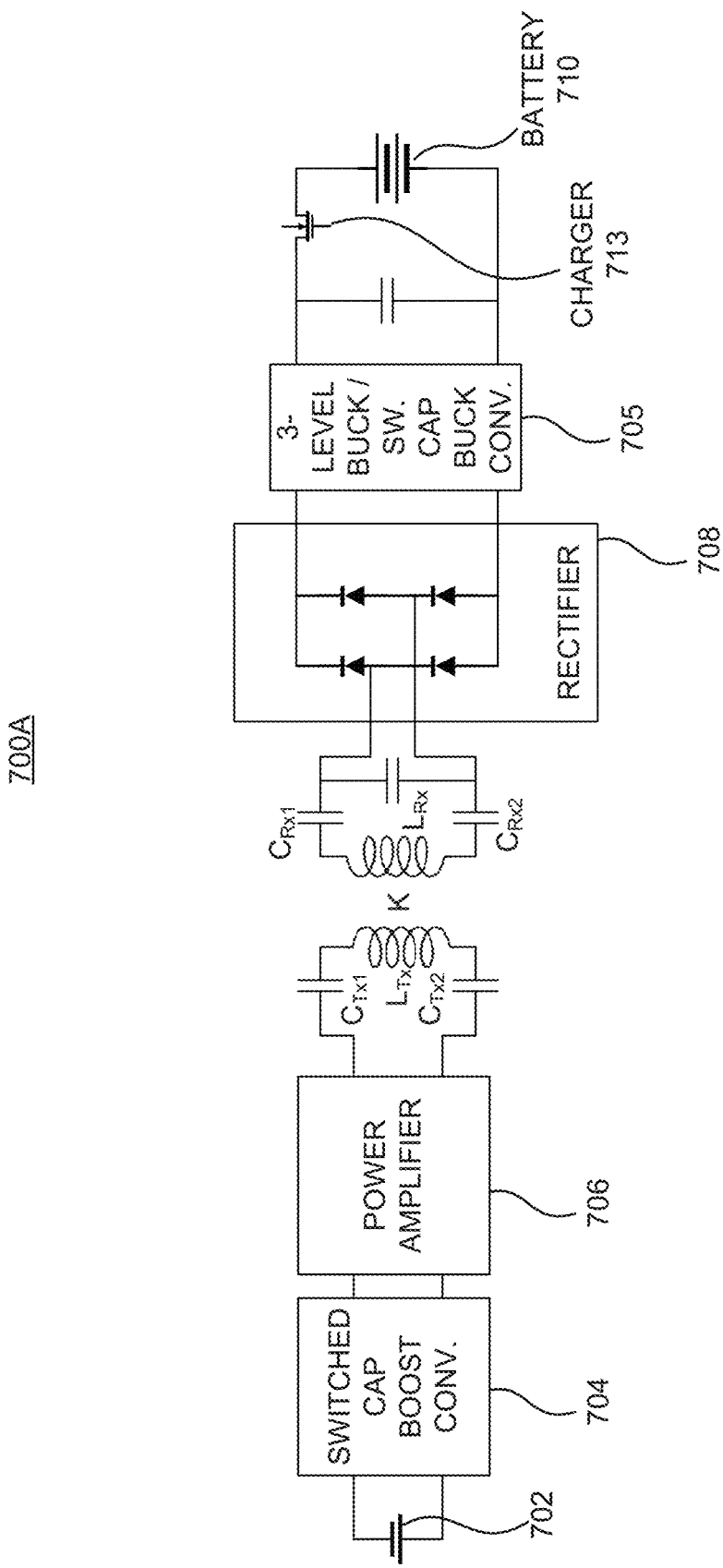
FIGS. 7A-7E illustrate schematic diagrams of a wireless charging transmitter-receiver pair for a wearable device with various configurations of switched capacitor boost and three-level buck converters, according to examples.

FIGS. 7A-7E illustrate schematic diagrams of a wireless charging transmitter-receiver pair for a wearable device with various configurations of switched capacitor boost and three-level buck converters, according to examples. Diagram 700A in FIG. 7A shows transmitter portion of the wireless charging system including a DC source 702 (e.g., a battery), a switched capacitor boost converter 704, a power amplifier 706, and an induction portion including transmit capacitors $C_{Tx1}$, $C_{Tx2}$, and transmit inductor $L_{Tx}$. Diagram 700A also shows the receiver portion including receive inductor $L_{Rx}$, receive capacitors $C_{Rx1}$, $C_{Rx2}$, rectifier 708, a three-level buck converter or a switched capacitor buck converter 705, and charger 713 coupled to battery 710 of the wearable device.

The example configuration in diagram 700A may allow the power amplifier 706 to be always under super high voltage operating condition. Thus, the wireless charging system may be in highest efficiency and high-power capability across a majority of load range. Input voltage boost up may employ high efficiency switched capacitor boost converter, such as one with a 1:2 ratio. An example accessory may be a 1.2 V NIMH/NiCd battery with a 1:4 or even higher ratio switched capacitor boost converter. Another example accessory may be a 2.4 V NIMH/NiCd battery pack (two in series) with a 1:2, 1:3, or 1:4 switched capacitor boost converter. Such accessories may be a lanyard, a charging case, a charge pack, etc. Example switched capacitor boost converter and three-level buck converter configurations are discussed below in conjunction with FIGS. 7B through 7E.

A switched capacitor boost converter may accomplish energy transfer and voltage conversion using any number of capacitors. A simple switched capacitor step-up cell formed by two capacitors and two diodes may be inserted in a boost converter in order to get a large DC line-to-load voltage ratio. The output capacitor and output diode of the boost converter are eliminated, their role being taken by the elements of the switching block. The switched capacitor boost converter may have a larger DC gain compared to other converters. In both switching stages, a direct transfer path of energy from line to load is created, thus increasing an energy conversion efficiency.

Figure 7B:
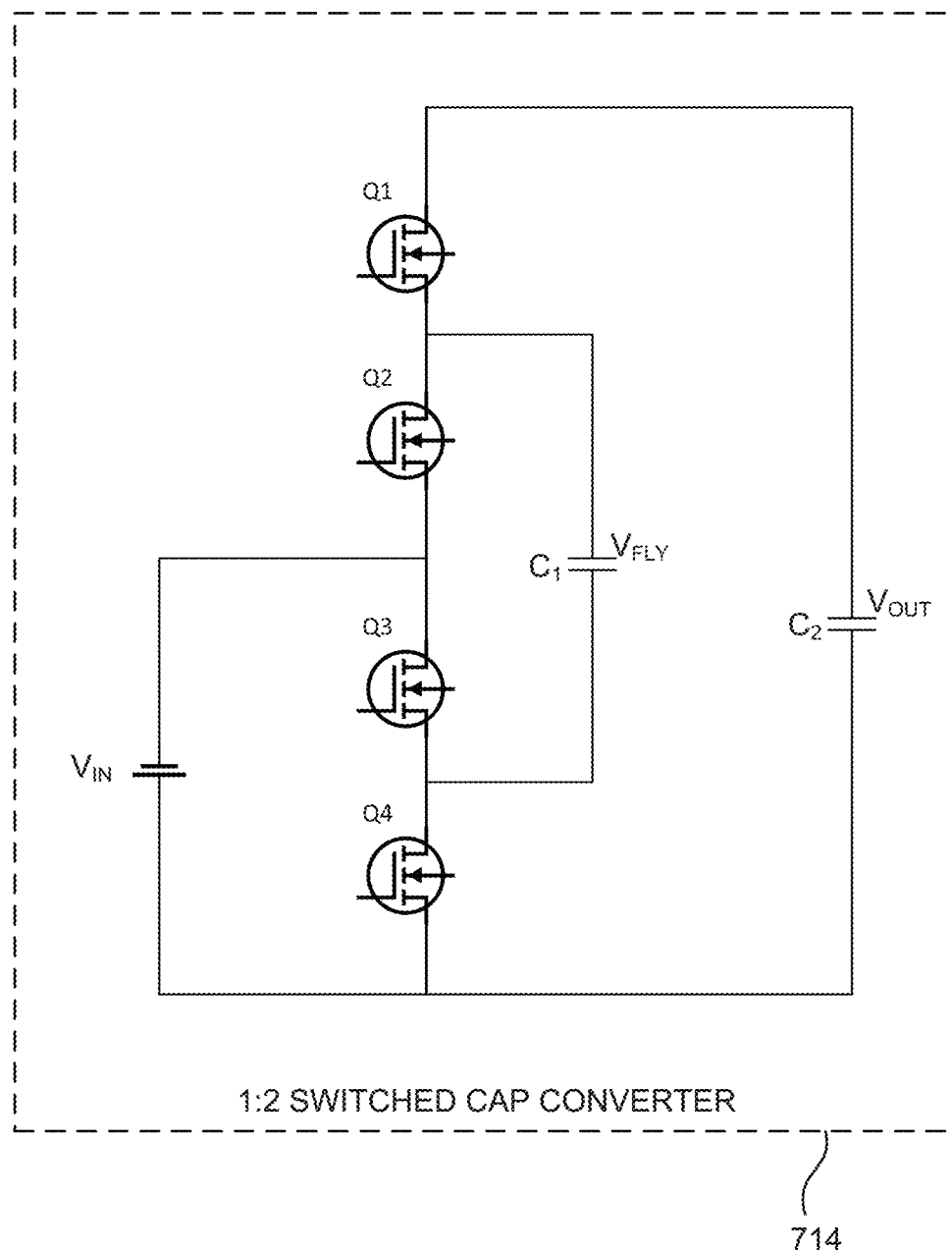

Diagram 700B in FIG. 7B shows an example switched capacitor converter 714, where the DC input voltage is provided to two of four serially coupled field effect transistors (FETs) Q1, Q2, Q3, and Q4 and an output voltage is received across a capacitor coupled in parallel to the four transistors. The configuration in diagram 700B is a 1:2 switched capacitor converter, where the output voltage is twice the input voltage. A flying voltage $V_{FLY}$ may be received across a flying capacitor coupled in parallel with the middle two transistors (Q2, Q3).

Figure 7C:
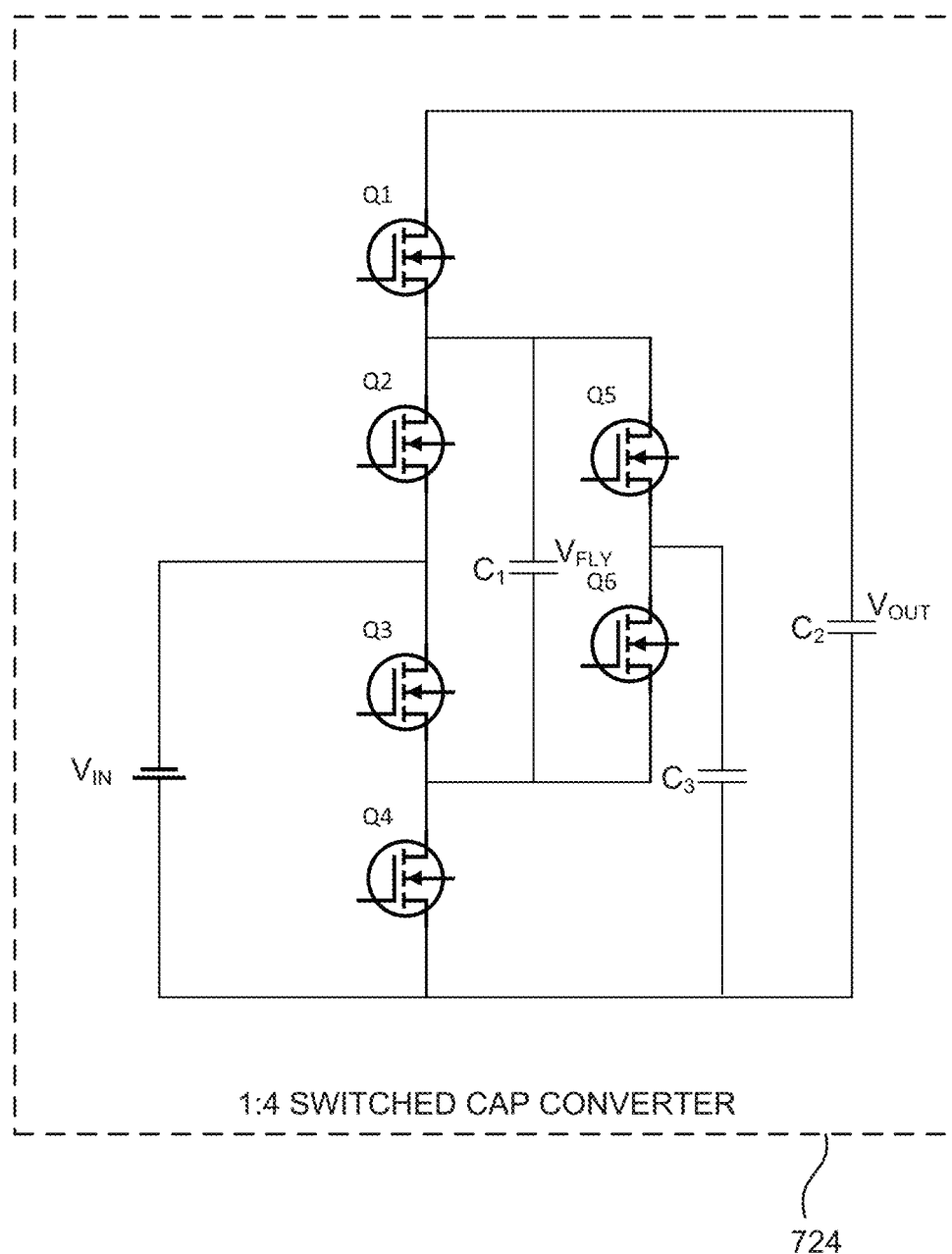

Diagram 700C in FIG. 7C shows an example switched capacitor converter 724, where the DC input voltage is provided to two of four serially coupled field effect transistors (FETs) Q1, Q2, Q3, and Q4 and an output voltage is received across a capacitor coupled in parallel to the four transistors. Differently, in the configuration of diagram 700 Cm two additional, serially coupled transistors, Q5 and Q6, is depicted as being coupled in parallel to the middle two transistors (Q2, Q3) of the first group. The configuration in diagram 700C illustrates a 1:4 switched capacitor converter, where the output voltage is four times the input voltage. A flying voltage $V_{FLY}$ may be received across a flying capacitor coupled in parallel with the middle two transistors (Q2, Q3).

A three-level converter topology that includes added capacitive storage elements and power switches may increase the equivalent switching frequency and generate a lower voltage across an inductor of the wireless charging system, which may enable the use of a smaller inductor improving total system efficiency, with lower power losses and cooler operating temperatures in a smaller footprint.

Figure 7D:
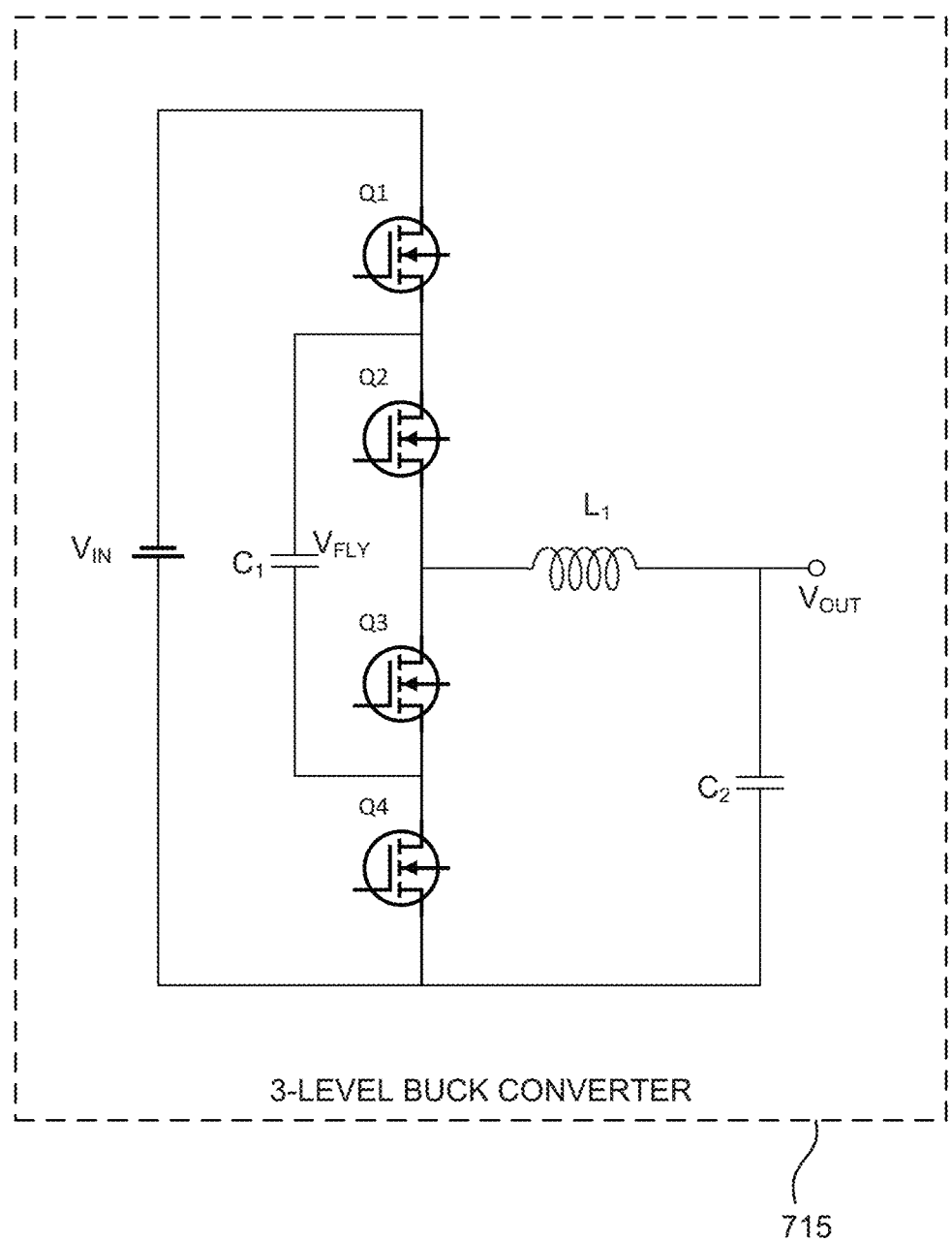

Diagram 700D in FIG. 7D shows an example three-level converter 715, where the DC input voltage is provided to four serially coupled field effect transistors (FETs) Q1, Q2, Q3, and Q4 and an output voltage may be received from an inductor coupled in series with a capacitor across two of the transistors (Q3, Q4). A flying voltage $V_{FLY}$ may be received across a flying capacitor coupled in parallel with the middle two transistors (Q2, Q3).

Figure 7E:
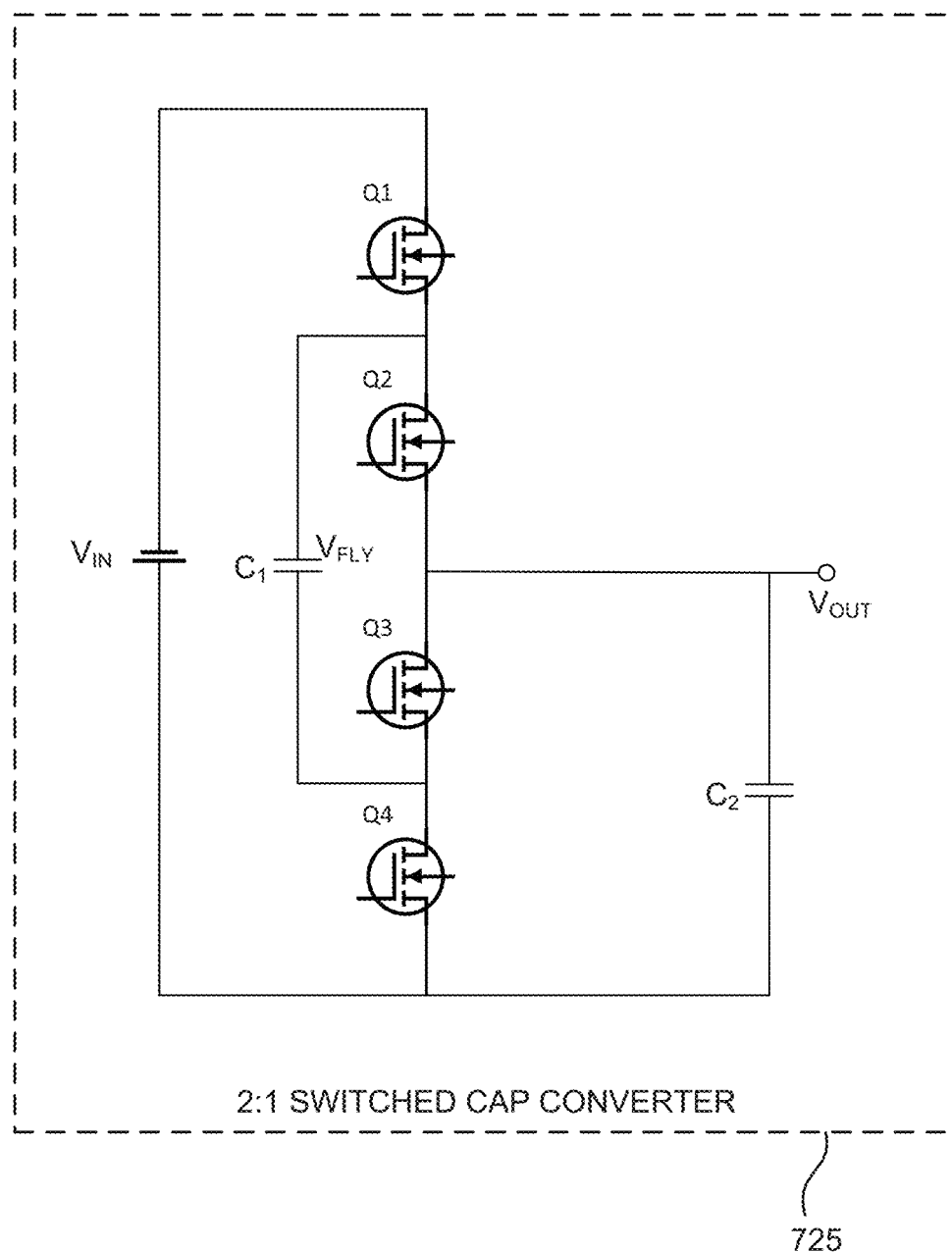

Diagram 700E in FIG. 7E shows an example switched capacitor converter 725, where the DC input voltage is provided to two of four serially coupled field effect transistors (FETs) Q1, Q2, Q3, and Q4 and an output voltage is received across a capacitor coupled two of the four transistors (Q3, Q4). A flying voltage $V_{FLY}$ may be received across a flying capacitor coupled in parallel with the middle two transistors (Q2, Q3). The configuration in diagram 700E is a 2:1 switched capacitor converter, where the output voltage is half the input voltage.

Figure 8A:
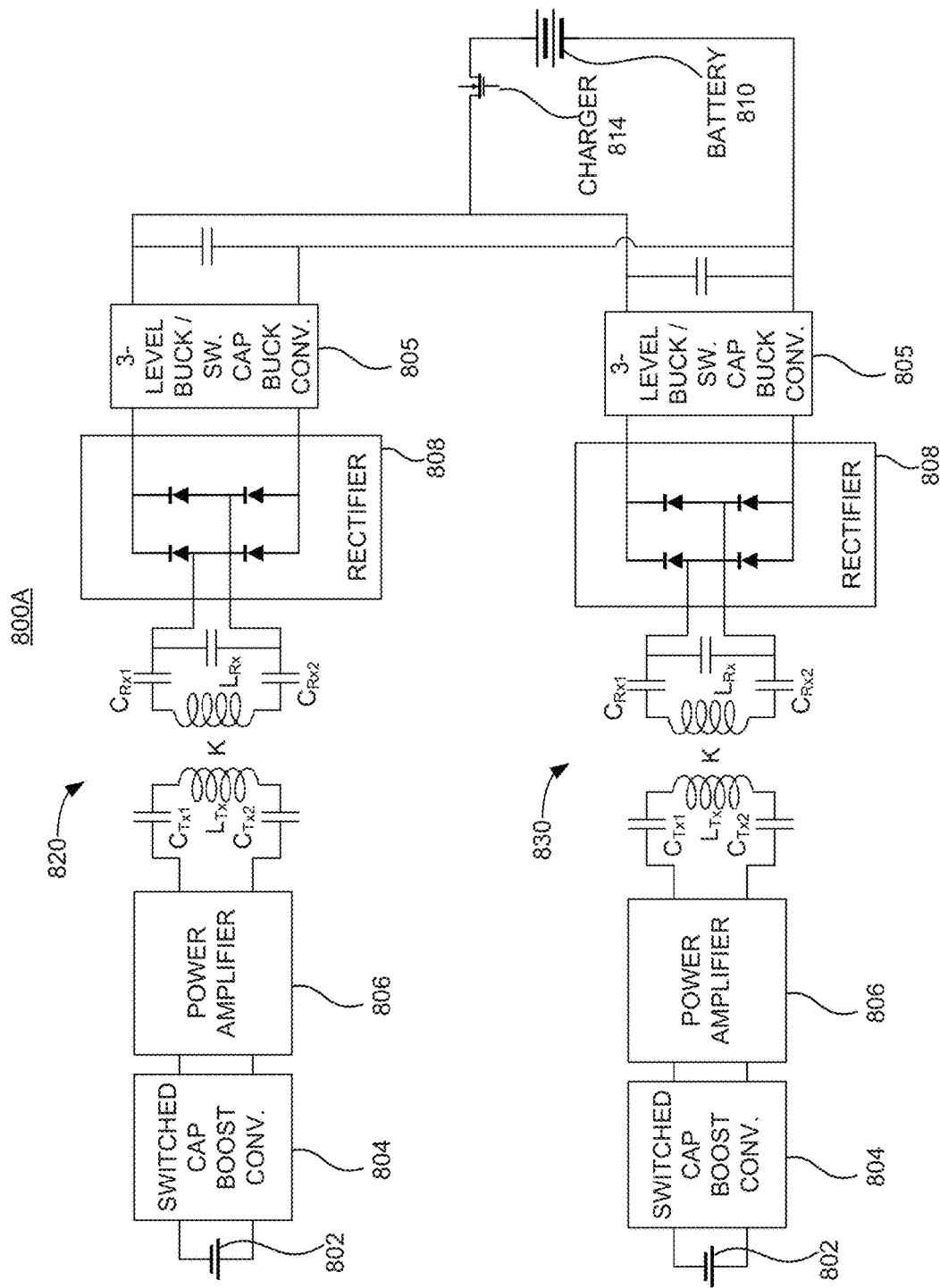
FIGS. 8A-8B illustrate schematic diagrams of a wireless charging transmitter-receiver pair for a wearable device with dual path switched capacitor boost and three-level buck converters, according to examples.
Figure 8B:
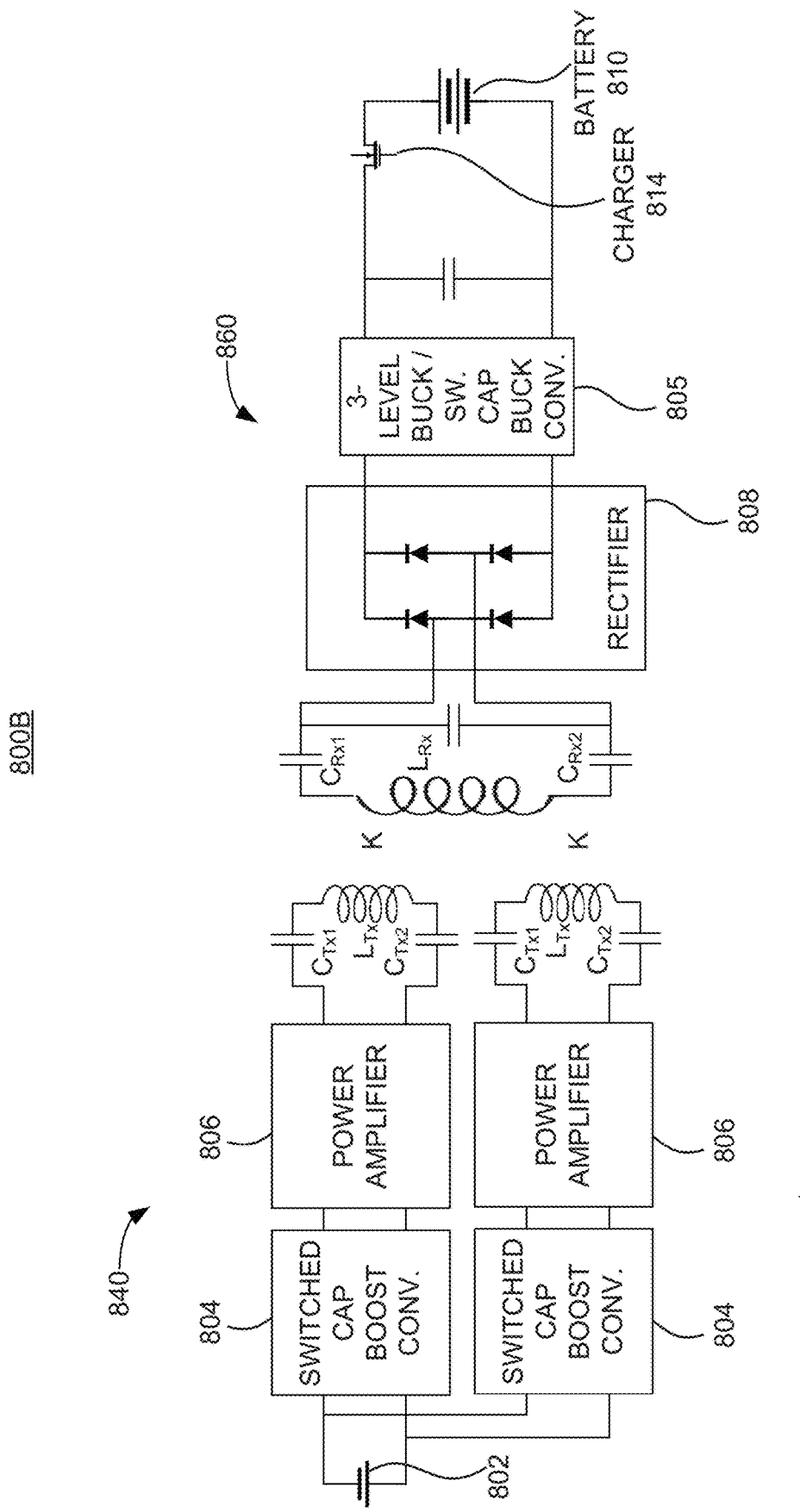

FIGS. 8A-8B illustrate schematic diagrams of a wireless charging transmitter-receiver pair for a wearable device with dual path switched capacitor boost and three-level buck converters, according to examples. Diagram 800A shows two wireless charging modules 820 and 830, where the transmitter portion of each wireless charging module (transmitter module) may include a DC source 802 (e.g., a battery), a switched capacitor boost converter 804, a power amplifier 806, and an induction portion including transmit capacitors $C_{Tx1}$, $C_{Tx2}$, and transmit inductor $L_{Tx}$. Diagram 800A also shows the receiver portion (receiver module) including receive inductor $L_{Rx}$, receive capacitors $C_{Rx1}$, $C_{Rx2}$, rectifier 808, a three-level buck converter or a switched capacitor buck converter 805.

In the example configuration of diagram 800A, the single charger 814 is coupled to the wearable device battery 810. Two wireless charging systems in parallel may increase power capability and reduce charging time improving battery thermal performance, for example. The dual path system may, for example, work with augmented reality glasses utilizing charging interfaces on both temples.

Diagram 800B shows a wireless charging system with two transmitter portions 840 and 850 (similar to the transmitter portions of wireless charging modules 820 and 830 in diagram 800A), where the transmitter inductors of the transmitter portions 840 and 850 may magnetically couple to a single receiver coil $L_{Rx}$ of a single receiver module 860. The two partial wireless charging modules in parallel may increase power capability and reduce charging time improving battery thermal performance, as in the configuration of diagram 800A. The example configuration of diagram 800B may be suitable for NFC wireless charging.

According to examples, a method of making the wireless charging interface is described herein. A system of making the wireless charging interface is also described herein. A non-transitory computer-readable storage medium may have an executable stored thereon, which when executed instructs a processor to perform the methods described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A wireless charging system for a wearable device, comprising:
   a first transmitter comprising:
      a first converter coupled to a direct current (DC) power source, and
      a first transmitter coil coupled to the first converter, the first transmitter coil to generate a first charging voltage for the wearable device via a first magnetic induction with a receiver coil;
   a second transmitter comprising:
      a second converter coupled to the DC power source, and
      a second transmitter coil coupled to the second converter, the second transmitter coil to generate a second charging voltage for the wearable device via a second magnetic induction with the receiver coil; and
   at least one receiver comprising:
      the receiver coil to magnetically couple with the first transmitter coil of the first transmitter and the second transmitter coil of the second transmitter;
      a rectifier coupled to the receiver coil;
      a voltage limiter coupled to the rectifier; and
      a charger coupled to the voltage limiter and a battery of the wearable device.

2. The wireless charging system of claim 1, wherein each of the first converter and the second converter comprises a buck-boost converter.

3. The wireless charging system of claim 1, wherein the at least one receiver further comprises:
   a third converter coupled to the rectifier and the voltage limiter.

4. The wireless charging system of claim 3, wherein
   each of the first converter and the second converter comprises a boost converter, and
   the third converter comprises a buck converter.

5. The wireless charging system of claim 3, wherein
   each of the first converter and the second converter comprises a switched capacitor boost converter, and
   the third converter comprises a three-level buck converter.

6. The wireless charging system of claim 1, wherein each of the first converter and the second converter comprises a switched capacitor boost converter, the switched capacitor boost converter comprising:
  four serially coupled transistors, wherein the DC power source is coupled across two of the four serially coupled transistors, and
  an output capacitor coupled in parallel with the four serially coupled transistors, wherein an output voltage of the switched capacitor boost converter is generated across the output capacitor.

7. The wireless charging system of claim 3, wherein
  each of the first converter and the second converter comprises a 1:2, a 1:3, or a 1:4 switched capacitor boost converter, and
  the third converter comprises a 2:1, a 3:1, or a 4:1 switched capacitor buck converter.

8. The wireless charging system of claim 1, wherein
  the first transmitter further comprises a first power amplifier coupled between the first converter and the first transmitter coil, and
  the second transmitter further comprises a second power amplifier coupled between the second converter and the second transmitter coil.

9. The wireless charging system of claim 1, wherein the voltage limiter comprises at least one of a transistor coupled in series with the rectifier or a capacitor coupled in parallel with the rectifier.

10. The wireless charging system of claim 1, wherein the charger comprises at least one of a transistor coupled in series with the voltage limiter or a capacitor coupled in parallel with the voltage limiter.

11. A wireless charging system for a wearable device, comprising:
  a first transmitter and a second transmitter, each of the first and second transmitters comprising:
    a first converter coupled to a direct current (DC) power source;
    a power amplifier coupled to the first converter, and
    a transmitter coil coupled to the power amplifier, the transmitter coil to generate a charging voltage for the wearable device via magnetic induction with a receiver coil; and
  a first receiver and a second receiver, each of the first and second receivers comprising:
    the receiver coil magnetically coupled to the respective transmitter coil;
    a rectifier coupled to the receiver coil;
    a second converter coupled to the rectifier; and
    a charger coupled to second converters of the first and second receivers and a wearable device battery.

12. The wireless charging system of claim 11, wherein
the first converter comprises a boost converter; and
the second converter comprises a buck converter.

13. The wireless charging system of claim 11, wherein
the first converter comprises a switched capacitor boost converter; and
the second converter comprises a three-level buck converter.

14. The wireless charging system of claim 13, wherein the first converter comprises a 1:2, a 1:3, or a 1:4 switched capacitor boost converter.

15. The wireless charging system of claim 11, wherein
the first converter comprises a switched capacitor boost converter; and
the second converter comprises a switched capacitor buck converter.

16. The wireless charging system of claim 15, wherein
the first converter comprises a 1:2, a 1:3, or a 1:4 switched capacitor boost converter; and
the second converter comprises a 2:1, a 3:1, or a 4:1 switched capacitor buck converter.

17. A wireless charging system for a wearable device, comprising:
  a first transmitter and a second transmitter, each of the first and second transmitters comprising:
    a first converter coupled to a direct current (DC) power source;
    a power amplifier coupled to the first converter; and
    a transmitter coil coupled to the power amplifier, the transmitter coil to generate a charging voltage for the wearable device via magnetic induction with a receiver coil; and
  a receiver comprising:
    the receiver coil magnetically coupled to the transmitter coils of the first and second transmitters;
    a rectifier coupled to the receiver coil;
    a second converter coupled to the rectifier; and
    a charger coupled to the second converter and a wearable device battery, wherein transmitter coils of both the first and second transmitters generate the charging voltage with the receiver coil of the receiver.

18. The wireless charging system of claim 17, wherein
the first converter comprises a boost converter or a switched capacitor boost converter; and
the second converter comprises a buck converter, a three-level buck converter, or a switched capacitor buck converter.

19. The wireless charging system of claim 18, wherein
the first converter comprises a switched capacitor boost converter, the switched capacitor boost converter comprising:
  four serially coupled transistors, wherein the DC power source is coupled across two of the four serially coupled transistors, and
  an output capacitor coupled in parallel with the four serially coupled transistors, wherein an output voltage of the switched capacitor boost converter is generated across the output capacitor.

20. The wireless charging system of claim 17, wherein
the first converter comprises a 1:2, a 1:3, or a 1:4 switched capacitor boost converter; and
the second converter comprises a 2:1, a 3:1, or a 4:1 switched capacitor buck converter.

* * * * *